Sept. 19, 1933.  E. F. ZAPARKA  1,927,536
AIRCRAFT SUSTAINING SYSTEM AND PROPULSION
Filed Oct. 3, 1929   3 Sheets-Sheet 1
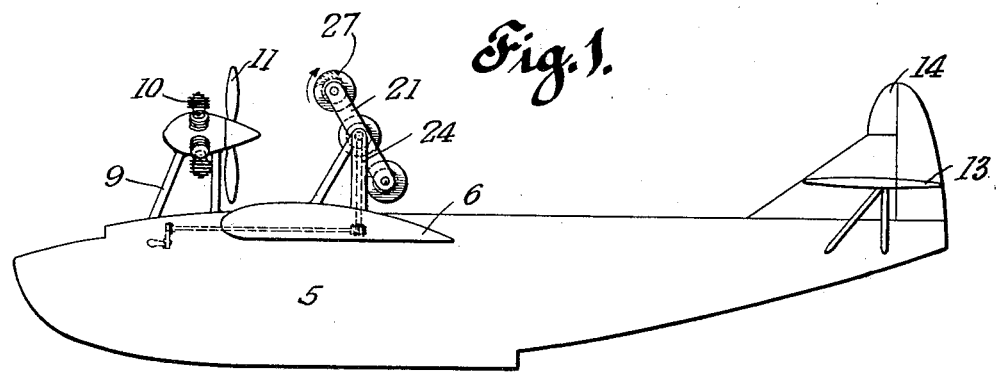
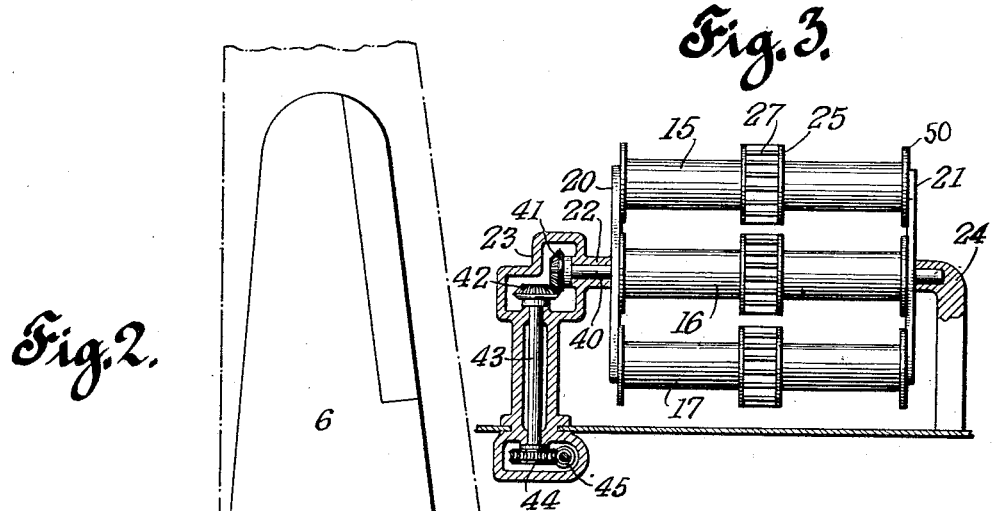
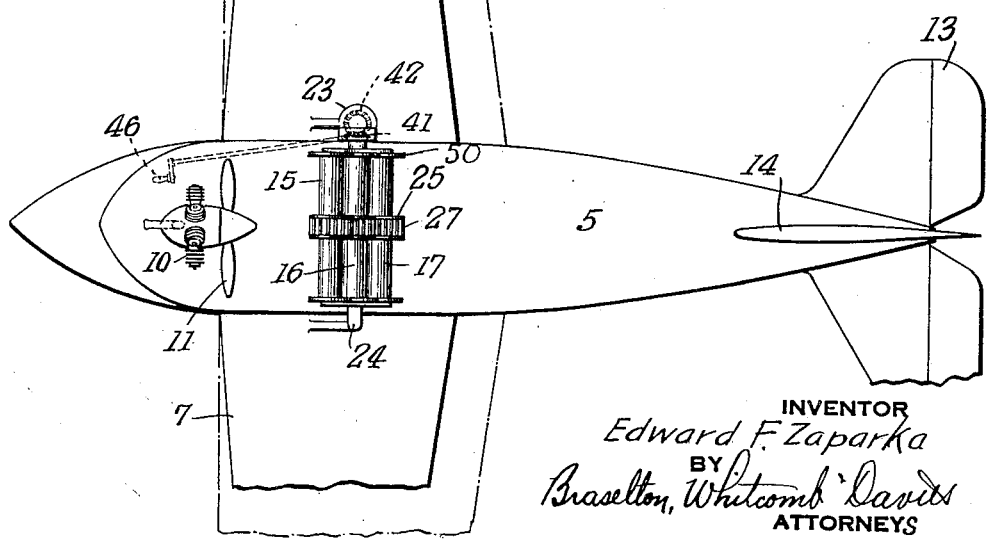
INVENTOR
Edward F. Zaparka
BY
Braselton, Whitcomb Davis
ATTORNEYS Sept. 19, 1933.  E. F. ZAPARKA  1,927,536
AIRCRAFT SUSTAINING SYSTEM AND PROPULSION
Filed Oct. 3, 1929  3 Sheets-Sheet 2

Inventor
Edward F. Zaparka

By Braselton, Whitcomb & Davis
Attorneys

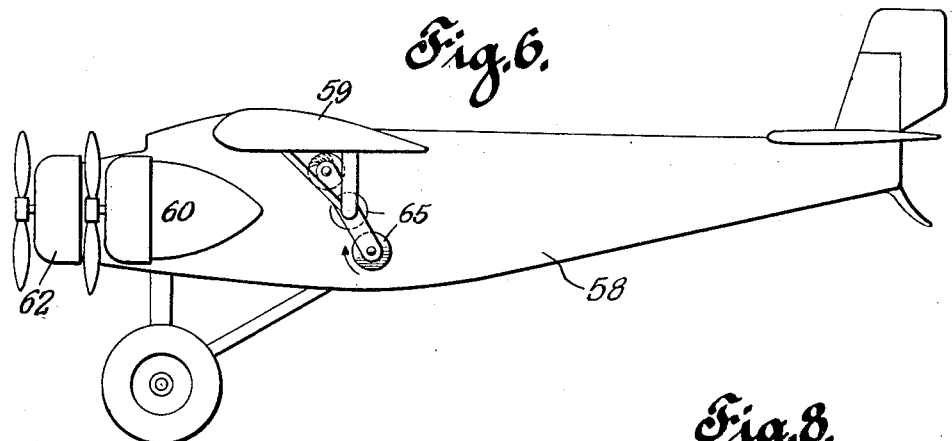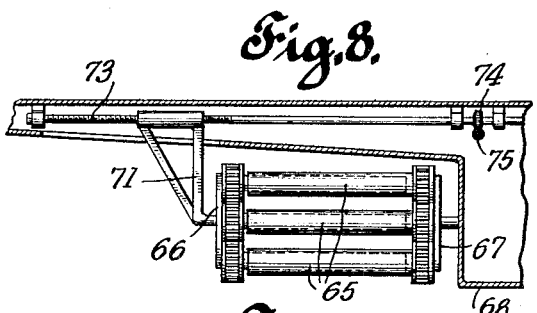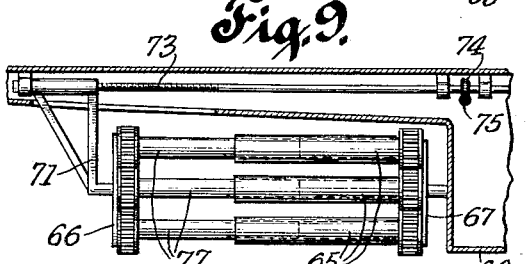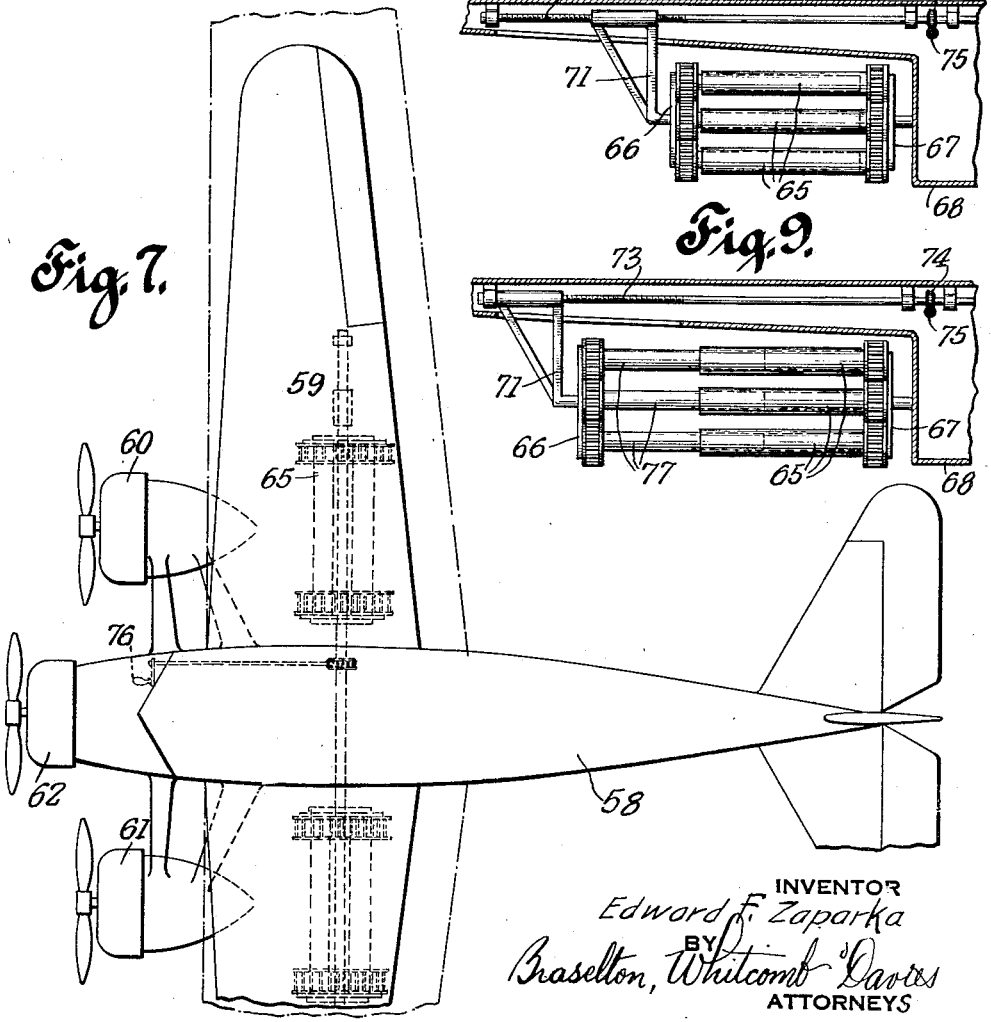

Patented Sept. 19, 1933

1,927,536

UNITED STATES PATENT OFFICE 1,927,536

AIRCRAFT SUSTAINING SYSTEM AND PROPULSION

Edward F. Zaparka, New York, N. Y., assignor to Zap Development Corporation, Wilmington, Del., a corporation of Delaware Application October 3, 1929. Serial No. 396,978

14 Claims. (Cl. 244—14)

This invention relates to an improved arrangement in aircraft lifting means particularly to that type of sustaining means which employs a moving surface located in a moving supporting medium to produce certain dynamic reactions for obtaining the aircraft supporting power or a portion thereof.

The invention comprehends a novel arrangement of movable surface with respect to the prime mover propeller and its resultant slip stream which, being produced by the prime mover, is instantly available and operative upon said surface at a relatively high speed independently of relative motion between the aircraft and the supporting medium as a whole, said surface being also moved or in the case of a cylinder, rotates on its axis with the result that I have provided an aircraft construction particularly capable not only of a very quick take off without extended ground movement as well as a practically vertical descent, but for given size a much greater weight may be sustained or with a certain weight a much smaller aircraft may be constructed or the speed of the aircraft may be greatly increased as compared with standard types of construction.

Thus the invention contemplates in one of its embodiments the utilization of a force resulting from the so-called Magnus effect set up by the movement of bodies located in the slip stream produced by a prime mover for the aircraft and also using the slip stream for moving said bodies.

My present invention also includes an aircraft construction using such novel arrangement of moving supporting means located in the slip stream as indicated in combination with a standard type of airfoil and suitably positioned with respect thereto.

This invention also provides an arrangement for varying the resultant actions produced by said movable supporting means to thereby produce an aircraft capable of very sensitive control and modification of the utilization of the primal source of available energy to either rapidly elevate or descend the craft or relatively quickly and easily change to a greatly increased horizontal or any desired directional speed for the aircraft.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of certain forms of the invention, in which Figure 1 is a side elevational view of an amphibian type of plane incorporating the sustaining and lifting devices of my invention;

Figure 2 is a top plan view of the plane shown in Figure 1;

Figure 3 is a fragmentary detail view of one form of the sustaining and lifting devices of my invention certain parts being shown in section;

Figure 6 is a side elevational view of an air vehicle of the multi-motor type plane incorporating the sustaining and lifting devices of my invention;

Figure 7 is a top plan view of the plane shown in Figure 6;

Figure 8 is a fragmentary detail view of a form of the sustaining device of my invention;

Figure 9 is a view similar to Figure 8 showing the sustaining device in an adjusted position.

Figure 5:
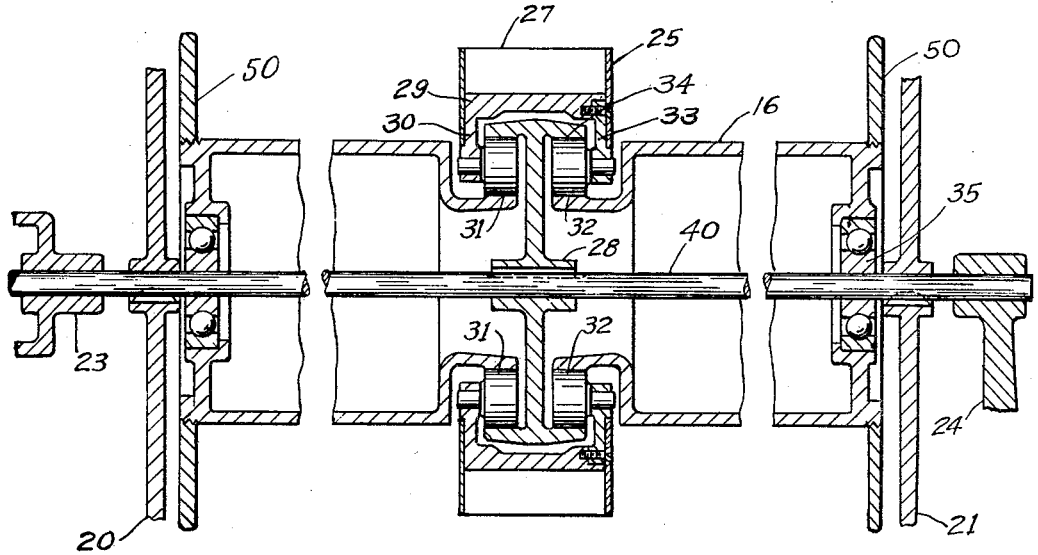
Figure 5 is an enlarged detail view of one of the units forming a part of my sustaining and lifting device illustrated in Figure 4.

Referring particularly to Figures 1 to 3 inclusive, I have illustrated one form of my invention as incorporated in an amphibian type plane, the latter consisting substantially of a hydroplane type fuselage 5 to which is secured a pair of transversely extending wings or airfoils 6 and 7. It is to be understood that an airplane or seaplane can be also used. Centered at the forward portion of the fuselage is secured a frame 9 carrying a suitable engine or prime mover 10 adapted to drive a propeller 11. The rear portion of the fuselage is provided with the necessary horizontal and vertical controls 13 and 14.

The moving sustaining devices herein shown comprise one or more revoluble elements which are adapted to operate on the so-called Magnus principle for the sustaining or lifting action, the same being preferably horizontally disposed transversely of the aircraft. In the form shown in Figures 1 and 3, such sustaining element comprises in this illustration a plurality of revoluble cylinders or may be cone or other shaped body. Cylinders 15, 16 and 17, of considerable length compared with their diameter, are suitably journalled upon frames 20 and 21, the frame 20 being journalled as shown at 22 upon a suitable frame 23, while frame 21 is journalled upon a suitable frame 24. Each cylindrical sustaining element is provided with a turbine wheel 25 formed of a plurality of radially extending blades 27. These turbines and the rotors are located within the area of the air slip stream resulting from the screw action of the propeller 11 while in motion. The slip stream, moving at a much higher speed than the surrounding air, in turn rotates the turbine and the sustaining elements 15, 16 and 17 are driven at a further increased speed by a speed increasing arrangement illustrated in Figure 5. Although one cylinder might be used a bank of cylinders or bodies permits me to use the entire cross sectional area of the slip stream with its attendant high velocity and the cylinders may vary in length to more accurately employ the slip stream. The sustaining elements may consist of a hollow cylindrical metal body of light weight or can be made of fabric suitably treated secured to and maintained in the desired shape by a suitable frame.

Figure 4:
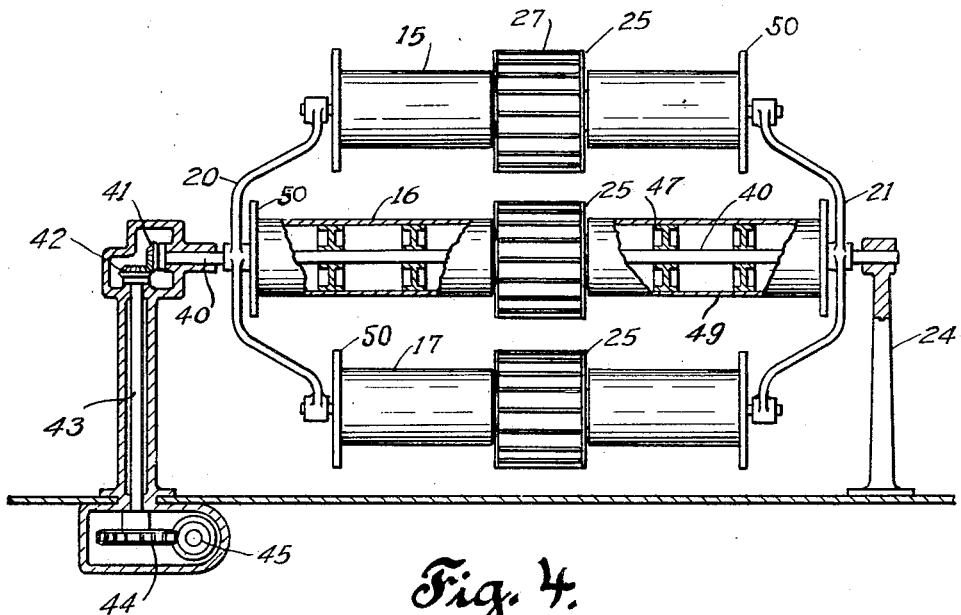
Figure 4 is an enlarged detail view similar to Figure 3 showing a modified form of the sustaining and lifting device of my invention.

Referring to Figure 4 of the drawings, I have illustrated sustaining elements 15, 16 and 17 of my invention, the same being of considerable length compared with their diameter and similarly here illustrated as differing in length with respect to each other, the purpose being the maximum utilization of the entire cross sectional area of the slip stream with its attendant high velocity. Each sustaining element is provided with a turbine wheel similar to the one illustrated with reference to Figure 3. Thus, these turbines and the rotor are located within the area of the slip stream resultant from the screw action of the propeller 11 while the same is in motion. In the form illustrated the sustaining elements consist of a series of radially disposed arms, spokes or skeleton frame 47 suitably carried by shaft 40 upon which the sustaining elements are supported. Connecting the outer ends of spokes 47 is a band 49 preferably made of sheet metal forming the body portion of the sustaining elements. Silk, cloth or any suitable treated fabric can be secured to spokes or frame 47 and maintained by the same in the desired form, cylindrical, cone shaped or of various configuration.

Referring to Figure 5 of the drawings I have illustrated the rotor element and its speed increasing means. For sake of simplicity, I have shown only one unit, but it is to be understood that the speed increasing means is present in each of said rotor elements. Fixed to the movable frames 20 and 21 is a shaft 40 supporting at its central portion a fixed member 28 cooperating with the turbine wheel 25. The turbine wheel 25 comprises a circular member 29 carrying the radially extending blades 27 and an inwardly extending flange 30 adapted to carry a series of rollers 31. A second set of rollers 32 is carried by flange 33, being removable to facilitate the assembly of parts, fixed to the circular member 29. Both sets of rollers 31 and 32 engage suitable circular tracks 34 forming part of the fixed member 28. The innermost surface of the rollers engage and support opposed ends of the rotor element 16 which are supported at their outermost ends by means of ball bearings 35 carried by the fixed shaft 26. It can be seen that the speed of the rotating element will be considerably greater than the speed of the turbine wheel 25 through the medium of the rollers 31 and 32. This structure makes possible to support several of the units upon frame 20 and adjust said frame with respect to the supporting member 24 without interfering with the operation of each individual unit. It is understood that I contemplate the use of a turbine directly secured to the sustaining movable element dispensing with the speed increasing means if the same may be desirable.

Applicant has found that by changing the relative position of the sustaining means or element when positioned in the slip stream of the propeller 11, the lifting effect imparted to the airplane by the sustaining element and the lifting action resulting from the airfoil can also be changed, and to this end I have provided means for adjusting the sustaining element with respect to the airfoil 6 and with respect to the propeller 11.

A shaft 40 secured to the frame 20 is provided at its end with a miter gear 41 which meshes with a similar gear 42 carried upon the upper end of the shaft 43, the lower end being provided with a worm wheel 44 meshed with a worm 45 to which is secured a manual controlled handle or crank 46. It can be seen from the foregoing that when it is desired to change or vary the position of the revoluble sustaining elements with respect to the propeller 11 or with the airfoil 6, movement of the crank 46 will impart to the frame 20 the desired adjustment through the medium of the gearing hereinbefore described.

I have found that by providing the sustaining elements with discs or plates at their extremities, their lifting action is increased. For this purpose each sustaining element is provided with end discs or plates 50 of larger diameter than that of the sustaining element and suitably secured thereto.

I have illustrated in Figures 6 to 9 inclusive a form of my invention as incorporated in a multi-motor plane which comprises substantially a fuselage 58 having laterally projecting airfoils 59 and a pair of auxiliary engines 60 and 61 located on either side of a principal source of motive power 62.

The sustaining devices of my invention are preferably positioned beneath the laterally projecting airfoils and in the slip stream of the propellers driven by the engines 60 and 61, each sustaining device comprising a plurality of rotors 65 carried by frames 66 and 67, the frame 67 being suitably journalled upon a member 68 forming a part of the fuselage while frame 66 is suitably journalled upon a bracket 71. In the form of my invention illustrated the rotors 65 are preferably made extensible to present more or less active surface as may be desired. To this end the bracket 71 is suitably supported upon a threaded rod 73 which is provided with a worm wheel 74 meshing with the suitable worm 75, the latter being adapted to be manipulated through the medium of a crank 76. The rotation of the crank 76 in one direction will cause the brackets 71 to move outwardly and thereby move the extension 77 normally telescoped within the rotors 65 outwardly to present a greater surface to the air. When it is desired to decrease the lifting effect of the sustaining device of my invention it is only necessary to move the crank in the opposite direction which operates to move the rollers 77 to their closed positions as particularly shown in Figure 8.

*Operation*

With the plane stationary the operator may, upon desiring to take off, speed up the engine creating a very stiff slip stream which operates on the turbines 26 which are connected through the speed increasing mechanism shown in Figure 5 to rotate the rollers or sustaining elements 15, 16 and 17 at a very high rate of speed with the top side moving with the direction of the air stream. By this, it will be seen that a very strong lifting force is produced with practically no necessarily horizontal movement of the plane on the ground. The relative amount of lifting force derived from the rollers compared to that of the wings or standard airfoil may be such as to permit an extremely steep climb and the relative size of the machine reduced in that the wings are smaller as suggested by the dotted lines illustrated in Figure 2.

In flight, the operator may at will vary the angularity of the frame carrying the several cylinders and thus render the second and third from the front of materially less effect, as they are located substantially behind the front roller in the line of flight. The available energy of the power plant may then be utilized for increased speed. Those skilled in the art will likewise appreciate that on descent a very steep angle may be maintained since by positioning the rollers to afford a maximum lifting power, a fall or too rapid acceleration in descent is avoided. Of course this can be varied, if desired, as indicated above.

In the embodiment of the invention in Figures 8 and 9 instead of swinging the several rollers 15, 16 and 17, the same are extended and retracted by the mechanism disclosed, depending upon the direction of rotation of the threaded shaft 73 manually operated by the driver as shown by the crank 76 illustrated in Figure 7.

It will also be understood that in various positions of the rotating elements with respect to the standard type of airfoils 6 and 7 an increase in efficiency of the latter is produced in that the slip stream produced by the movement of said airfoil in the air is modified by the down wash or stream produced by the rotating cylinders, the velocity thereby being increased at the zone surrounding the rollers.

It is to be understood that throughout a standard construction of airplane or aircraft is employed, unless modified as hereinabove indicated, as to the size, for example, of the airfoils and to receive the variations in such standard construction necessary to incorporate the added features in the form of the cylinders or auxiliary lifting mechanism.

It is apparent that, within the scope of the invention modifications and different arrangements may be made other than is herein disclosed and the same could be used in different environments, the present disclosure being illustrative merely, the invention comprehending all variations thereof.

What I claim is:

1. An aerial vehicle including a support; an engine carried by said support; a propeller driven from said engine and adapted to produce an air stream; a movable cylindrical surface carried by said support adapted to be located within the air stream produced by said propeller and also rotated thereby.

2. An aerial vehicle comprising a support; means carried by said support to accelerate the adjacent air producing an air stream; a movable cylindrical surface carried by said support adapted to produce when moved a lifting effect, said movable surface being arranged within the accelerated air stream; rotating means for said cylindrical surface driven by said air stream; and means to change the effective lift of said surface.

3. An aerial vehicle comprising a support; means carried by said support to accelerate the adjacent air producing an air stream; a movable cylindrical surface carried by said support adapted to produce when moved a lifting effect, said movable surface being arranged within the accelerated air stream; and rotating means driven by said air stream and speed increasing means between the last mentioned means and said movable surface.

4. In an aircraft, a support; an airfoil carried by said support; means suitably carried by the support for causing a change in flow of the surrounding medium; a plurality of movable surfaces supported by the support adapted to be located within the flow of medium produced by said means; means to move said surfaces to produce a lifting effect; and means for moving said movable surfaces with respect to said airfoil.

5. In an aircraft, means suitably supported by the aircraft for causing a change in flow of the surrounding medium; a plurality of movable surfaces supported by the aircraft adapted to be moved to produce a lifting effect and located in the flow of medium produced by said means; means to vary the number of surfaces in effective operation and means to change the position of said surfaces relative to its support.

6. An aerial vehicle including a support; an engine carried by said support; a propeller driven from said engine and adapted to produce an air stream; a plurality of movable surfaces carried by said support adapted to be located in the air stream produced by said propeller and also rotated thereby; and means to vary the number of surfaces in effective operation.

7. An aerial vehicle including a support; an airfoil carried by said support; means adapted to produce an air stream; a movable cylindrical surface carried by said support adapted to be rotated to produce a Magnus effect acting as a lifting force and located within the air stream produced by said means, said movable surface being positioned to one side of said airfoil as to normally increase the lifting effect of the latter by permitting the resultant air flow from said movable surface to modify the stream line of flow from said airfoil.

8. An aerial vehicle including a support; an airfoil carried by said support; means adapted to produce an air stream; a movable surface carried by said support adapted to be moved to produce a lifting effect and located within the air stream produced by said means, said movable surface being positioned with respect to said airfoil as to normally increase the lifting effect of the latter by permitting the resultant air flow from said movable surface to modify the stream line of flow from said airfoil; and means for varying the proportion of movable surface in effective operation.

9. An aerial vehicle including a support; an airfoil carried by said support; means adapted to produce an air stream; a cylindrical surface carried by said support adapted to be rotated and located within the air stream produced by said means, said movable surface being positioned to one side of said airfoil as to normally increase the lifting effect of the latter by permitting the resultant air flow from said movable surface to modify the stream line of flow from said airfoil; and means for varying the relative position of said surface with respect to said airfoil.

10. An aerial vehicle comprising a support; means carried by said support to accelerate the adjacent air producing an air stream; a movable cylindrical surface carried by said support adapted to produce when moved a lifting effect, each of the ends of said movable surface being arranged within the accelerated air stream; and rotating means for said cylindrical surface driven by said air stream.

11. In an aircraft, means for producing an air stream, a rotor airfoil supported within said air stream, air driven means for revolving said rotor airfoil at a surface speed higher than that of said air stream, and means for varying the effective surface of said airfoil.

12. In an aircraft, means for producing an air stream, a rotor airfoil supported within said air stream, air driven means for revolving said rotor airfoil at a surface speed higher than that of said air stream, and means for changing the length of said rotor airfoil.

13. In an aircraft, means for producing an air stream, a plurality of rotor airfoils in a frame supported in and coacting with said air stream, and means for varying the angle said frame makes with said air stream to change the effectiveness of the combined rotor airfoils.

14. An aircraft comprising a fixed airfoil, a rotor airfoil adjacent to the trailing surface of said fixed airfoil and spaced therefrom, and means for varying the position of said rotor airfoil relative to said fixed airfoil.

EDWARD F. ZAPARKA.